United States Patent [19]
Maglio et al.

[11] 3,726,569
[45] Apr. 10, 1973

[54] PIN FASTENING FOR SEGMENTED SNOWMOBILE TRACKS

[75] Inventors: Ralph Maglio, Westhampton; Arnold G. Peterson, Sunderland, both of Mass.

[73] Assignee: J. P. Stevens & Co. Inc., New York, N.Y.

[22] Filed: Aug. 18, 1971

[21] Appl. No.: 172,748

[52] U.S. Cl..................305/35 R, 74/245 P, 74/254, 198/189, 305/58
[51] Int. Cl. ..........................................B62d 55/22
[58] Field of Search......................305/35 R, 36, 58; 74/254, 245 P; 198/189, 195

[56] References Cited

UNITED STATES PATENTS

| | | | |
|---|---|---|---|
| 2,911,091 | 11/1959 | Imse | 74/245 P |
| 2,368,611 | 1/1945 | Charnock | 305/58 |
| 3,036,695 | 5/1962 | Thuerman | 74/254 X |
| 3,602,364 | 8/1971 | Maglio | 305/35 R |
| 2,435,194 | 2/1948 | Bigley | 305/58 |
| 2,481,727 | 9/1949 | Deffenbaugh | 305/58 X |
| 1,975,107 | 10/1934 | Knox | 305/58 X |

FOREIGN PATENTS OR APPLICATIONS

| | | | |
|---|---|---|---|
| 396,187 | 8/1933 | Great Britain | 305/58 |

*Primary Examiner*—Richard J. Johnson
*Attorney*—Robert Ames Norton et al.

[57] ABSTRACT

Segmented snowmobile tracks of elastomeric segments with mating hollow elements on both transverse edges of each segment held together with a pin, such as a steel pin, are provided with positive rigid pin locking means at one or both ends of the hollow segment, the locking means being in the form of rigid elements against which one or both ends of the pin abut. For snowmobile tracks these can be metal inserts which can be forced into the end of the hollow member. The insert may be on one end only, in which case the other end of the hollow hinge member is provided with a small hole which is much smaller than the cross-section of the pin but permits insertion of a suitable tool to drive the pin out. For larger vehicles, such as tracks on trucks and the like, there should be positive stops, such as through bolts on both ends. In the case of a snowmobile track there is sufficient resilience in the elastomer so that the pin can be driven out with a hammer and drift when repair of track segments is necessary.

3 Claims, 9 Drawing Figures

PIN FASTENING FOR SEGMENTED SNOWMOBILE TRACKS

BACKGROUND OF THE INVENTION AND RELATED APPLICATION snowmobile tracks have been made endless, usually of elastomer laminates, such as rubber and fabric. Recently an improved segmented snowmobile track has been developed and is described and claimed in the co-pending application of Maglio and Russell Ser. No. 843,595, filed July 22, 1969, and now U.S. Pat. No. 3,602,364, Aug. 31, 1971. The improved segmented belt is made of segments of molded or cast elastomer, such as, for example, polyurethane and similar elastomers which in thick sections are fairly stiff and which resist embrittlement at the low temperatures at which the tracks are used. These segments on their transverse edges carry mating hollow elements which are held together with pins, such as steel pins. Preferably the elements have substantially flat faces abutting directly against directly opposite, substantially flat faces of elements on an adjacent mating segment. When the preferred segments are pinned together, they form a hinge which cannot open to any substantial angle and the flexibility of the belt at the hinge is therefore determined primarily only by the flexibility of the elastomer forming the segments. From the standpoint of the improvement of the present invention, however, the elements can be formed so that when pinned together the resulting hinge can open to a considerable angle because the segments do not have flat faces abutting each other. While such a belt can incorporate the improvements of the present invention, it is less desirable as large deflections up or down at the hinge permit passage of snow, which reduces the efficiency of the track.

The steel pins in segmented snowmobile tracks are subject to heavy lateral stresses and vibration and problems have arisen where a pin has been shaken or forced out of the hollow elements in a segment edge. If the pin is forced all the way out, the belt comes off, but even if it is only forced part of the way out the projecting pin at an edge of the belt is undesirable as it can catch obstacles and, under certain circumstances, injure users of the snowmobile. It is with an improved fastening of the pins of segmented snowmobile tracks that the present invention deals. A typical snowmobile track is shown in FIG. 5 of the Maglio and Russell patent to which reference is hereby made and FIG. 4 of said patent shows two segments with pins partially inserted. For convenience and clarity FIG. 4 of the Maglio and Russell patent is repeated in the present application as FIG. 1 and is identical with the figure of the patent except for a small change at one end of each hinge cylinder as will be described below.

It has been proposed to use shallow detents in an elastomeric sleeve for holding the pintle of a caster. Such a detent is described in the Haydock U.S. Pat. No. 2,992,449. The edges of the projections of elastomer are beveled to fairly flat angles so that a caster pintle can easily be introduced or removed by hand. The detent is perfectly satisfactory for caster pintles as it only has to hold against a pintle falling out under the weak force of gravity of the relatively light caster. Such detents are useless for holding positively pins from segmented snowmobile tracks against being forced out by the very large sideways forces which can develop in use, particularly when a snowmobile executes rapid turning maneuvers or the track is struck on the side by an obstacle, such as a tree trunk. These forces are orders of magnitude greater than on a caster pintle, and a detent with sloping edges is not practically useful in holding in a snowmobile track pin.

Heavier tracked vehicles, such as trucks, require an even stronger pin locking device as in the size needed in such tracks the grip of the elastomer on a metal insert can be inadequate.

SUMMARY OF THE INVENTION

The present invention will be described first in connection with snowmobile tracks. It provides for a rigid insert, for example of metal, which fits or forms steep-sided grooves in one or both end elements of the snowmobile track. The insert is tapped in with a hammer or screwed in. The inserts, of course, are inserted at one or both ends after the pin has been inserted which joins one segment to another. It is possible to provide one end of the hollow element in each segment with a relatively much smaller hole than the cross-section of the pin. When the pin is inserted from the other end, it abuts firmly against the partially closed other end, but the small hole permits inserting a drift or other tool and hammering out the pin where removal is necessary for repairs or other purposes. At the other end, or both ends where inserts are used on both ends, the insert is forced in and is in the nature of a wedge-shaped insert which forms steep-sided grooves in the elastomer, and while it can be hammered in or hammered out, the force required is far greater than any normal stresses in snowmobile operation. Inserts which are either threaded and mating with threads in the segments or which can be screwed in and cut their own threads are also adequate and of course are introduced by screwing in instead of hammering in. With such inserts to be used on one end of the pin only, it is necessary to have a small hole at the other end which can take a drift.

While metal inserts and stoppers are often preferable, the inserts can be of stiff, firm plastic and when screwed in, if an insert of this type is used, the heat of friction of screwing in may soften the elastomer to incipient melting so that it bonds to a plastic insert. Normally there is no bonding to metal inserts, which therefore do not require the generation of sufficient heat to effect softening of the elastomer. Because of relative ease of removal metal inserts or stoppers are usually preferred, but elements made of other materials are not excluded from the invention.

As far as the track as a whole is concerned, it is in no way compromised by the present invention. In other words, all of the advantages of the segmented track are retained with the additional improvement of the positive fastening of the pin against working out during use. That the present invention produces a belt which is not a compromise of any of the desirable properties of other segmented belts is a distinct practical advantage. The description of the drawings show a very simple drive for a snowmobile track with slots in the flat portions of the segments into which sprocket teeth protrude. The present invention has nothing to do with the particular drive mechanism and other types are useful, for example molded teeth on the inside of the track which fit into depressions in driving hubs. Such a drive is described and claimed in the Peterson and Sunderland application Ser. No. 75,110, filed Sept. 24, 1970, and assigned to the assignee of the present application. This is only one illustration of other types of drives, and it is an advantage that the present invention retains the safety of pins in segmented belts without requiring any special or particular drive mechanism, and so, of course, the present invention is applicable to segmented snowmobile or other tracks regardless of how they are driven.

With much heavier vehicles, such as trucks, the size of the pin and inserts is beyond that which can permit practically introduction by hammering in or removal by hammering out. For tracks using such large pins various types of bolt fastenings across the ends of the pin are preferable.

DESCRIPTION OF THE PREFERRED EMBODIMENTS

Figure 1:
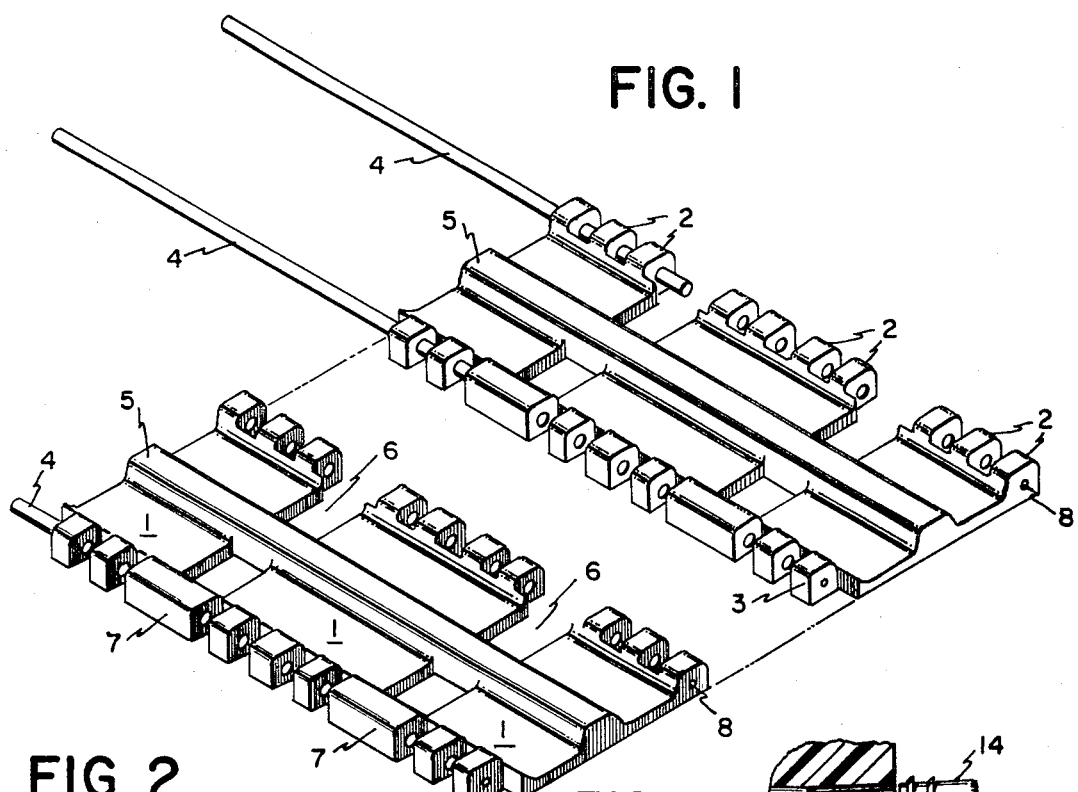
FIG. 1 shows two segments of a snowmobile track with pins partially inserted.

The present invention is an improvement on pin fastening of segmented molded or cast elastomer snowmobile or other vehicle belts or tracks. Typical of such a track is that shown in FIG. 5 of the Maglio and Russell patent referred to above. FIG. 4 of that patent is repeated with a slight modified as FIG. 1 in the present case for clarity. It shows segments of cast or molded elastomer, such as polyurethane, the segments being shown with flat sections (1) and hollow projections on each transverse edge. These projections are shown on one side at (2) and on the other at (3). The projections mate with their flat faces abutting on the mating segments and are held together by pins, such as steel pins, (4). Each segment is provided with a traction rib or cleat (5), and there are two slots half way out from the center to the edges (6). These slots, which are closed with longer hollow element (7), form driving slots receiving the conventional sprockets for snowmobile drive. As the drive is not changed, the sprockets are not shown. FIG. 1 is slightly modified over the corresponding figure of the patent by providing small holes (8) in one end of the segments. These holes are so much smaller than the cross-section of the pin that the pin will not pass through, but when a pin has to be removed a drift can be inserted and the pin hammered out.

Figure 2:
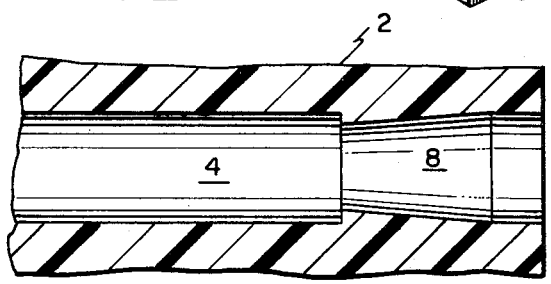
FIG. 2 is an enlarged section through an end element.
Figure 3:
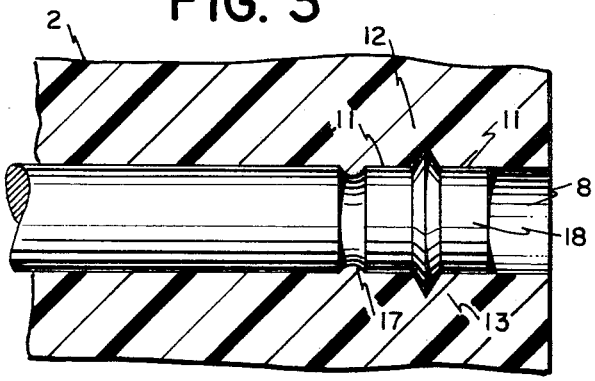
FIG. 3 is a section similar to FIG. 2 of a modified pin fastening.

FIG. 2 shows the end of the hinge member (2) of FIG. 1. There is a tapering bore (9) and the pin (4) is shown as coming against a small shoulder. After the pin has been inserted a wedge-shaped metal insert, which is shown in FIG. 3, is hammered in. The wedge-shaped central flange (12) deforms the elastomer when it is hammered in and causes some flow of plastic to form a shoulder (17) at the back of the cylindrical portions (11) of the metal insert. It will be noted that the central wedge-shaped flange (12) has formed a steep-sided notch in the elastomer. The pin cannot force the insert out under any ordinary stresses of a snowmobile track but it is possible to remove the pin by hammering, for example with a drift through the opening (8) if this modification is used or a larger drift if the insert is repeated at both ends. After removal of the pin, repair or replacement of segments is effected, the pin is reinserted and fastened with the metal insert as has been described above. If desired, a plug (22) may close the bore (8) and keep out snow or other dirt. Ordinarily the plug will be slightly larger than the bore and the elastomer compresses sufficiently to hold it in by friction. It is not subjected to any significant forces from the pin, which are all absorbed by the metal insert.

Figure 4A:
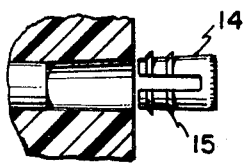
FIGS. 4A to 4C are three views of a modified fastening in three stages of insertion.
Figure 4B:
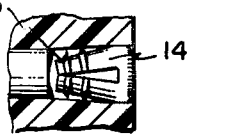
Figure 4C:
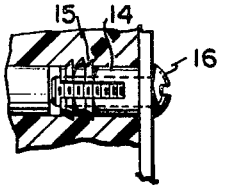

Instead of a rigid fastener as shown in FIG. 3, a hollow metal insert may be used, as is shown in FIGS. 4A, 4B and 4C. This metal insert is shown at (14) with edges (15) projecting much as non-spiral, deep screw threads. 4A shows the hollow fastener being inserted, 4B showing that it can given some, the amount of give being exaggerated. If desired, the hollow may be threaded and extend all the way through and a screw (16) used to expand the projections (15) into the elastomer. This is illustrated in FIG. 4C. After the insert has been made with the pin in place, the screw can be removed. The modification of FIG. 4C has some advantages over that shown in 4A and 4B as it is easier to remove.

Figure 5:
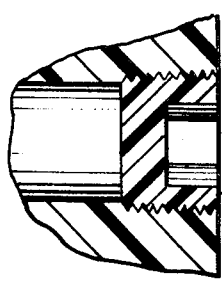
FIG. 5 is a section similar to FIGS. 2 and 3 of a modified form of fastening.

FIG. 5 illustrates a somewhat different design. Here a hollow threaded plug (10), screws into the elastomer after the pin has been inserted, and cuts threads in the elastomer or may be screwed in a pre-molded thread. If desired, the fastening may be either of metal or of plastic and if the latter and compatible with the elastomer of the segment, some heat may be applied to soften the edges so that the threads become partly solid with the elastomer. Of course where the threads are locked by adhesion or melting together, the maximum fastening strength is obtained. However, ordinary threads are quite adequate and ordinarily this simpler construction would be preferred.

Figure 6:
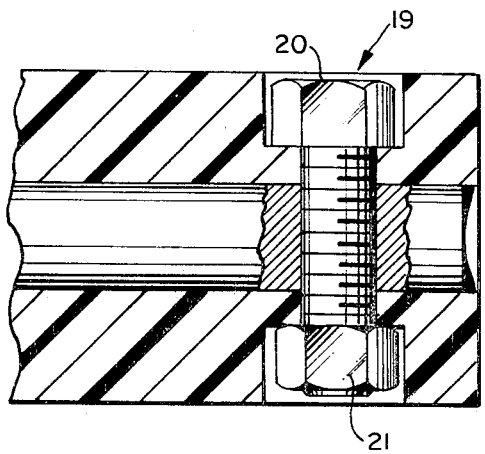
FIGS. 6 and 7 show two different types of transverse bolt stops.
Figure 7:
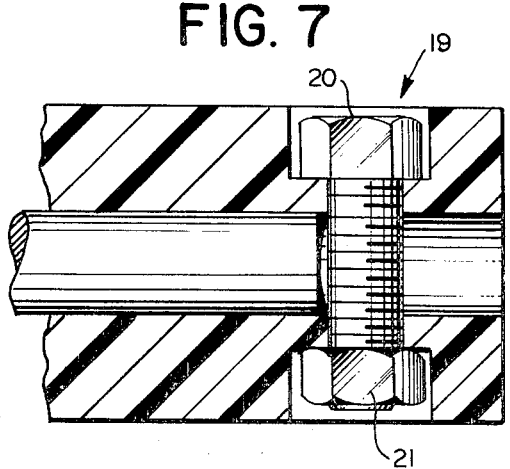

FIGS. 6 and 7 show two modifications of a stopper in the form of a through bolt. The other elements which are the same as in the preceding figures carry the same reference numerals. In FIG. 6 there is a hole in the pin and a bolt (19) is screwed through it. The head (20) of the bolt is in a recess in the elastomer and in a corresponding recess there is held the nut (21). This is the strongest and most rigid fastening. However, it does require aligning the holes in the pin with the holes in the elastomer through which the bolt passes.

FIG. 7 is a little simpler as here the bolt is simply beyond the end of the pin instead of through a hole in it. This is very strong but not quite as strong as FIG. 6 as the pin pushing against the bolt under a sudden great force could, at least theoretically, cant the bolt a little in the elastomer. This might cause it to jump out. However, for all ordinary stresses even in a track on a fair sized truck the fastening of FIG. 7 has adequate strength. Needless to say, it will ordinarily be necessary to have bolt-through fastenings on both ends of the pin if maximum strength is desired. However, the structure of FIG. 1 with a very small hole in one end of the elastomer can be used and permits tapping out a pin. However, at this end the pin is being held by elastomer, albeit thick elastomer, and for some tracks which are exposed to maximum stresses the all metal fastening at both ends is preferable. It would, of course, be possible to have the bolts made of a very strong plastic, such as nylon, but this is both more expensive than metal and does not present any real advantage and so is not preferred.

The drawings show several types of fastening but are intended to be illustrative only, and the invention is not limited to the particular designs set forth. Any other forms of fastening which oppose the ends of the pin or into the elastomer having steep shoulders or grooves are useful.

We claim:

1. In a segmented elastomeric track for a tracked vehicle in which the transverse edges of the segments are provided with integral, hollow, mating members and pinned together with pins, the improvement which comprises, a. pins slightly shorter than the transverse width of the track segment, and
   b. stopping elements contacting the ends of the pins and anchored in the segments, the stopping elements being rigid plugs having diameters at their ends approximating the diameter of the hollow mating member and provided with a rigid portion of larger diameter and having steep sides, which plug on insertion deforms the elastomer of the segment, forming therein a deep, steep-sided groove.

2. A track according to claim 1, and particularly adaptable for snowmobile purposes, in which the rigid plug is a cylinder of diameter about the same as that of the hollow mating member and a central wedge-shaped flange, the plug being insertable by hammering and when hammered in deforming the plastic of the segment, the wedge-shaped flange forming the deep, steep-sided groove therein.

3. A track according to claim 2 in which the cylinder is of metal sufficiently rigid to deform the plastic when hammered in to form the deep, steep-sided groove.

* * * * *